United States Patent
Williams et al.

(10) Patent No.: US 6,408,409 B1
(45) Date of Patent: Jun. 18, 2002

(54) METHOD AND APPARATUS FOR RING BUFFER FLOW ERROR DETECTION

(75) Inventors: Emrys J. Williams, Palo Alto; Andrew E. Phelps, Encinitas, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/418,624

(22) Filed: Nov. 15, 1999

(51) Int. Cl.$^7$ .................. G11C 29/00; G06F 11/00; H03M 13/00
(52) U.S. Cl. .................. 714/719; 714/763; 714/800
(58) Field of Search .................. 714/718, 719, 714/720, 721, 722, 723, 763, 800

(56) References Cited

U.S. PATENT DOCUMENTS

| | | | | | |
|---|---|---|---|---|---|
| 4,692,893 A | * | 9/1987 | Casper | ...................... | 710/55 |
| 5,208,810 A | * | 5/1993 | Park | .......................... | 370/230 |
| 5,469,545 A | * | 11/1995 | Vanbuskirk et al. | ........ | 709/234 |
| 5,581,705 A | * | 12/1996 | Passint et al. | .............. | 709/200 |
| 5,732,286 A | * | 3/1998 | Leger | ......................... | 710/57 |
| 5,765,187 A | * | 6/1998 | Shimizu et al. | ............. | 711/110 |
| 5,884,099 A | * | 3/1999 | Klingelhofer | ................ | 710/52 |
| 5,898,893 A | * | 4/1999 | Alfke | .......................... | 710/57 |
| 5,978,868 A | * | 11/1999 | Maas | .......................... | 710/52 |
| 6,212,161 B1 | * | 4/2001 | Regula | ....................... | 370/223 |
| 6,233,675 B1 | * | 5/2001 | Munson et al. | ............. | 712/227 |

FOREIGN PATENT DOCUMENTS

EP        0 185 924        11/1985

OTHER PUBLICATIONS

Castel–Branco, L.; Nunes, M.S., 'Clock recovery for circuit emulation services over ATM', Proceedings of the International IFIP–IEEE Conference on Broadband Communications, 1996. Global Infrastructure for the Information Age, 1996, pp. 617–625.*

IBM Technical Disclosure Bulletin entitled "Highly Reliable Data Buffer which Provides for Both One–and Two–Byte Operations," by D.J. Lang and R.G. Nelson, vol. 23, No. 3, Aug. 1980.

IBM Technical Disclosure Bulletin entitled "Efficient Dual–Port First–In, First–Out Buffer with an Overrun and Underrun Detection Scheme," vol. 23, No. 12, May 1991.

IBM Technical Disclosure Bulletin entitled "Error Detection Method for Ram with Stuck Output Latches," vol. 23, No. 7, Dec. 1990.

* cited by examiner

Primary Examiner—Christine T. Tu
Assistant Examiner—Joseph D. Torres
(74) Attorney, Agent, or Firm—Park, Vaughan & Fleming LLP (57) ABSTRACT

A system for detecting underflow and overflow errors arising within a ring buffer. When the system receives a data word to be transferred through the ring buffer, the system generates a flow indicator value to be stored with the data word in the ring buffer. This flow indicator value contains information that facilitates determining if an underflow has occurred while reading from the ring buffer, or if an overflow has occurred while writing to the ring buffer. Next, the system writes the data word along with the flow indicator value into an entry in the ring buffer. At a later time, the system reads the entry from the ring buffer and generates a predicted flow indicator value. The system compares the flow indicator value read from the ring buffer with the predicted flow indicator value. If the flow indicator value differs from the predicted flow indicator value, the system generates an error signal indicating that an underflow or an overflow has occurred. In one embodiment of the present invention, the flow indicator value periodically changes, so that a predictably different flow indicator value is written into the entry in the ring buffer upon successive write operations to the entry. This predictably different flow indicator value allows the system to detect an underflow condition or an overflow condition by comparing the flow indicator value with the predicted flow indicator value. If the flow indicator value read from the ring buffer differs from the predicted flow indicator value, an underflow condition or overflow condition has occurred.

19 Claims, 8 Drawing Sheets

| | | | | | | | | | | | | | | | | | | |
|---|---|---|---|---|---|---|---|---|---|---|---|---|---|---|---|---|---|---|
| WRITE COUNTER | 0 | 1 | 2 | 3 | 4 | 5 | 6 | 7 | 8 | 0 | 1 | 2 | 3 | 4 | 5 | 6 | | |
| FLOW INDICATOR (WRITTEN) | 0 | 0 | 0 | 0 | 0 | 0 | 0 | 0 | 1 | 1 | 1 | 1 | 1 | 1 | 1 | 1 | 0 | 0 |
| READ COUNTER | | | 0 | 1 | 2 | 3 | 4 | 5 | 6 | 7 | 8 | 0 | 1 | 2 | 3 | 4 | 5 | 6 |
| FLOW INDICATOR (READ) | 0 | 0 | 0 | 0 | 0 | 0 | 0 | 0 | 0 | 1 | 1 | 1 | 1 | 1 | 1 | 1 | 0 | 0 |
| PREDICTED FLOW INDICATOR | 0 | 0 | 0 | 0 | 0 | 0 | 0 | 0 | 1 | 1 | 1 | 1 | 1 | 1 | 1 | 1 | 0 | 0 |
| FLOW ERROR | 0 | 0 | 0 | 0 | 0 | 0 | 0 | 0 | 0 | 0 | 0 | 0 | 0 | 0 | 0 | 0 | 0 | 0 |

FIG. 6B

| | | | | | | | | | | | | | | | | | |
|---|---|---|---|---|---|---|---|---|---|---|---|---|---|---|---|---|---|
| WRITE COUNTER | 0 | 1 | 2 | 3 | 4 | 5 | 6 | 7 | 8 | 0 | 1 | 2 | 3 | 4 | 5 | 6 | |
| FLOW INDICATOR (WRITTEN) | 0 | 0 | 0 | 0 | 0 | 0 | 0 | 0 | 1 | 1 | 1 | 1 | 1 | 1 | 1 | 1 | 0 |
| READ COUNTER | 0 | 1 | 2 | 3 | 4 | 5 | 6 | 7 | 8 | 0 | | | | | | | |
| FLOW INDICATOR (READ) | 0 | 0 | 0 | 0 | 0 | 0 | 0 | 0 | 1 | 1 | | | | | | | |
| PREDICTED FLOW INDICATOR | 0 | 0 | 0 | 0 | 0 | 0 | 0 | 0 | 1 | 0 | 0 | 0 | 0 | 1 | 1 | 1 | 1 |
| FLOW ERROR | 0 | 0 | 0 | 0 | 0 | 0 | 0 | 0 | 0 | 1 | 1 | 1 | 1 | 1 | 1 | 1 | 1 |

FIG. 6C

| | | | | | | | | | | | | | | | | | |
|---|---|---|---|---|---|---|---|---|---|---|---|---|---|---|---|---|---|
| WRITE COUNTER | 0 | 1 | 2 | 3 | 4 | 5 | 6 | 7 | 8 | 0 | 1 | 2 | 3 | | | | |
| FLOW INDICATOR (WRITTEN) | 0 | 0 | 0 | 0 | 0 | 0 | 0 | 0 | 1 | 1 | 1 | 1 | 1 | | | | |
| READ COUNTER | 0 | 1 | 2 | 3 | 4 | 5 | 6 | 7 | 8 | 0 | 1 | 2 | 3 | 4 | 5 | 6 | |
| FLOW INDICATOR (READ) | 0 | 0 | 0 | 0 | 0 | 0 | 0 | 0 | 0 | 1 | 1 | 1 | 1 | 1 | 0 | 0 | |
| PREDICTED FLOW INDICATOR | 0 | 0 | 0 | 0 | 0 | 0 | 0 | 0 | 1 | 1 | 1 | 1 | 1 | 1 | 1 | 1 | |
| FLOW ERROR | 0 | 0 | 0 | 0 | 0 | 0 | 0 | 0 | 0 | 0 | 0 | 0 | 0 | 1 | 1 | 1 | |

| ENTRY | A |  |  |  |  |  |  |  |  | B |  |  |  |  |  |  |  |  | C |  |  |  |  |  |  |  |  | D |  |  |  |
|---|---|---|---|---|---|---|---|---|---|---|---|---|---|---|---|---|---|---|---|---|---|---|---|---|---|---|---|---|---|---|---|
|  | 7 | 8 | 0 | 1 | 2 | 3 | 4 | 5 | 6 | 7 | 8 | 0 | 1 | 2 | 3 | 4 | 5 | 6 | 7 | 8 | 0 | 1 | 2 | 3 | 4 | 5 | 6 | 7 | 8 | 0 | 1 |
| WRITE COUNTER | 1 | 1 | 0 | 0 | 0 | 0 | 0 | 0 | 0 | 0 | 0 | 0 | 0 | 0 | 0 | 0 | 0 | 0 | 0 | 0 | 0 | 1 | 1 | 0 | 0 | 0 | 0 | 0 | 0 | 1 | 1 |
| FLOW INDICATOR | 1 | 1 | 0 | 0 | 0 | 0 | 0 | 0 | 0 | 1 | 1 | 0 | 0 | 0 | 0 | 0 | 0 | 0 | 0 | 1 | 1 | 0 | 0 | 0 | 0 | 0 | 0 | 1 | 1 | 0 | 0 |
| FLOW DIRECTION | 1 | 1 | 0 | 0 | 0 | 0 | 0 | 0 | 0 | 1 | 1 | 0 | 0 | 0 | 0 | 0 | 0 | 0 | 0 | 1 | 1 | 0 | 0 | 0 | 0 | 0 | 0 | 1 | 1 | 0 | 0 |

FIG. 7A

| ENTRY | PREDICTED BITS (FLOW) | (DIR) | ENTRY | SEEN BITS (FLOW) | (DIR) | MEANING | PREDICTED FLOW XOR PREDICTED DIR XOR OBSERVED DIR |
|---|---|---|---|---|---|---|---|
| B | 0 | 0 | A | 1 | 1 | UNDERFLOW | 1 |
| B | 0 | 0 | B | 0 | 0 | OK | – |
| B | 0 | 0 | C | 1 | 0 | OVERFLOW | 0 |
| B | 0 | 0 | D | 0 | 1 | STRANGE | – |
| C | 1 | 0 | B | 0 | 0 | UNDERFLOW | 1 |
| C | 1 | 0 | C | 1 | 1 | OK | – |
| C | 1 | 0 | D | 0 | 0 | OVERFLOW | 0 |
| C | 1 | 0 | A | 1 | 1 | STRANGE | – |
| D | 0 | 1 | C | 1 | 0 | UNDERFLOW | 1 |
| D | 0 | 1 | D | 0 | 1 | OK | – |
| D | 0 | 1 | A | 1 | 0 | OVERFLOW | 0 |
| D | 0 | 1 | B | 0 | 1 | STRANGE | – |
| A | 1 | 1 | D | 0 | 1 | UNDERFLOW | 1 |
| A | 1 | 1 | A | 1 | 0 | OK | – |
| A | 1 | 1 | B | 0 | 0 | OVERFLOW | 0 |
| A | 1 | 1 | C | 1 | 1 | STRANGE | – |

FIG. 7B

METHOD AND APPARATUS FOR RING BUFFER FLOW ERROR DETECTION

BACKGROUND

1. Field of the Invention

The present invention relates to communication of digital data. More specifically, the present invention relates to a method and an apparatus for detecting underflow or overflow conditions within a ring buffer.

2. Related Art

As data transfer rates within computer systems continue to increase, it is becoming harder to coordinate the sending and receiving of data between computer system components. Data is typically transferred between computer system components under control of a global clock signal that is used to control when data is sent and received.

As clock frequencies are increased to provide faster data transfer rates, clock skew can become a significant problem. Clock skew causes a global clock signal to arrive at various computer system components at different and unpredictable times. Hence, a first component that sends data to a second component cannot be certain when the data will be latched by the second component. Clock skew is especially significant between computer system components that are located on different modules or on different chips.

One way to remedy some of the communication problems involved in transferring data between computer system components is to buffer data transfers between computer system components using a FIFO that is implemented as a ring buffer. A ring buffer typically includes an array of data entries as well as a read pointer and a write pointer. As data arrives at the ring buffer, it is stored in the ring buffer using the write pointer to advance through the array and store consecutive data items in consecutive locations in the array. When the write pointer reaches the end of the array it wraps around to the beginning. On the receiving side, the read pointer is used to retrieve consecutive data items from the array.

Unfortunately, a ring buffer can be prone to overflow and underflow errors. An overflow error occurs when the array becomes full and write pointer advances through the read pointer, causing data to be overwritten before it can be read. An underflow error occurs when the array becomes empty and the read pointer advances through the write pointer and reads entries before they are written.

Flow errors, such as underflow errors or overflow errors, typically cannot be detected by examining data as it is received. Conventional error detecting and error correcting techniques (such as error correcting codes and error detecting codes) are able to detect when one or more bits in a data word are changed during a data transfer. However, they cannot detect when an entire data word is substituted as the result of an overflow or an underflow error.

In a particularly versatile implementation, write pointer logic uses a clock associated with the data arriving from a remote source, while read pointer logic uses a local clock. The use of multiple clocks makes flow error detection particularly difficult.

What is needed is a method and an apparatus that allows overflow and underflow errors to be detected by examining data that is received at the end of a data transfer process.

SUMMARY

One embodiment of the present invention provides a system for detecting underflow and overflow errors arising within a ring buffer. When the system receives a data word to be transferred through the ring buffer, the system generates a flow indicator value to be stored with the data word in the ring buffer. This flow indicator value contains information that facilitates determining if an underflow has occurred while reading from the ring buffer, or if an overflow has occurred while writing to the ring buffer. Next, the system writes the data word along with the flow indicator value into an entry in the ring buffer. At a later time, the system reads the entry from the ring buffer and generates a predicted flow indicator value. The system compares the flow indicator value read from the ring buffer with the predicted flow indicator value. If the flow indicator value differs from the predicted flow indicator value, the system generates an error signal indicating that an underflow or an overflow has occurred.

In one embodiment of the present invention, the flow indicator value periodically changes, so that a predictably different flow indicator value is written into the entry in the ring buffer upon successive write operations to the entry. This predictably different flow indicator value allows the system to detect an underflow condition or an overflow condition by comparing the flow indicator value with the predicted flow indicator value. If the flow indicator value read from the ring buffer differs from the predicted flow indicator value, an underflow condition or overflow condition has occurred.

In one embodiment of the present invention, the flow indicator value includes a single bit that changes every time a write pointer for the ring buffer reaches a maximum value.

In one embodiment of the present invention, the flow indicator value is encoded as changes between even and odd parity within a parity bit in the data word.

In one embodiment of the present invention, the ring buffer is of odd size and the flow indicator value is a single bit that alternates between zero and one on successive write operations.

In one embodiment of the present invention, the flow indicator value is encoded as changes between even and odd parity in a parity bit in the data word. Furthermore, the ring buffer is of odd size and the parity bit alternates between even and odd parity on successive write operations.

In one embodiment of the present invention, the flow indicator value further includes a flow direction indicator that allows an underflow error to be differentiated from an overflow error.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computer System

Figure 1:
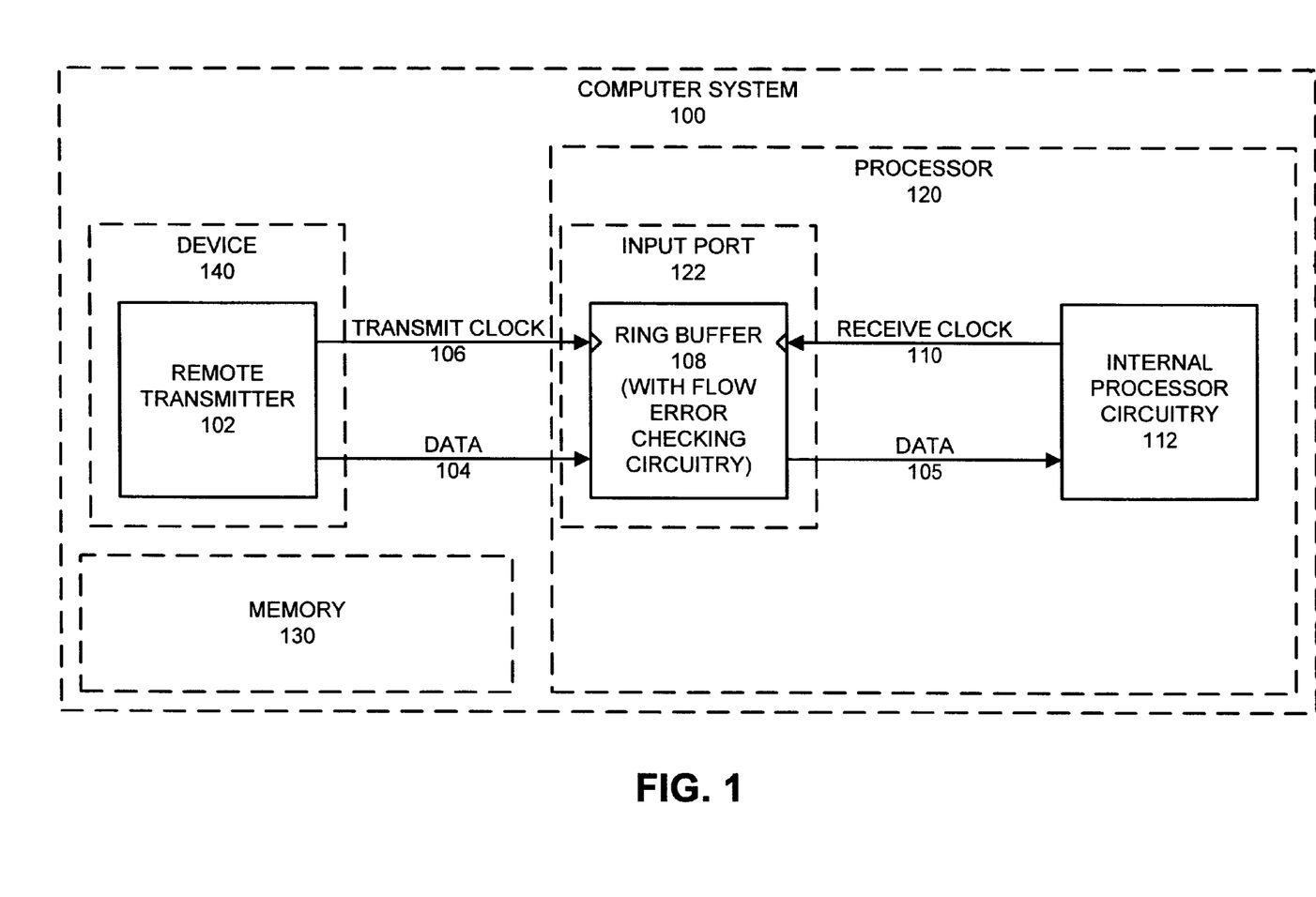
FIG. 1 illustrates a computer system in accordance with an embodiment of the present invention.

FIG. 1 illustrates a computer system 100 in accordance with an embodiment of the present invention. Computer system 100 includes a number of components, including processor 120, memory 130 and device 140.

Processor 120 may include any type of computing device that is capable of processing code and/or data. This includes, but is not limited to, a mainframe processor, a multi-processor system, a microprocessor, a device controller, and a computing unit within an appliance. Processor 120 includes input port 122, which receives data 104 from other computer system components. Within ring buffer 108, data 104 is converted into data 105, which is transferred from input port 122 into internal processor circuitry 112, which operates under control of receive clock signal 110.

Input port 122 includes ring buffer 108, for buffering data 104 as data 104 is transferred from device 140 into internal processor circuitry 112. Data 104 is clocked into ring buffer 108 from device 140 using transmit clock signal 106. Data 105 is clocked out of ring buffer 108 using receive clock signal 110. Note that ring buffer 108 includes special circuitry for detecting flow errors in accordance with an embodiment of the present invention.

Also note that this flow error detection circuitry can generally be used with any type of device that is involved in transferring data, not only in a processor. For example, flow error detection circuitry can be used in an I/O device, a memory device or a switching device within a digital system.

Memory 130 includes any type of random access memory that can be used to store code and/or data for execution by processor 120.

Device 140 may include any type of device within computer system 100 that transmits data to processor 120. This includes, but is not limited to, a peripheral device, an off-chip cache, another memory and another processor. Device 140 includes remote transmitter 102, which transmits data 104 into ring buffer 108. Device 140 may be located on a separate module or on a separate chip from processor 120. Alternatively, device 140 may be located on the same chip as processor 120. In the illustrated embodiment, device 140 is located within computer system 100. In another embodiment, device 140 is located externally to computer system 100.

Note that present invention is not limited to a ring buffer within computer systems. In general, the present invention can be applied to any system for transferring data that uses a ring buffer, including for example, a digital communication network.

First Embodiment of Ring Buffer

Figure 2:
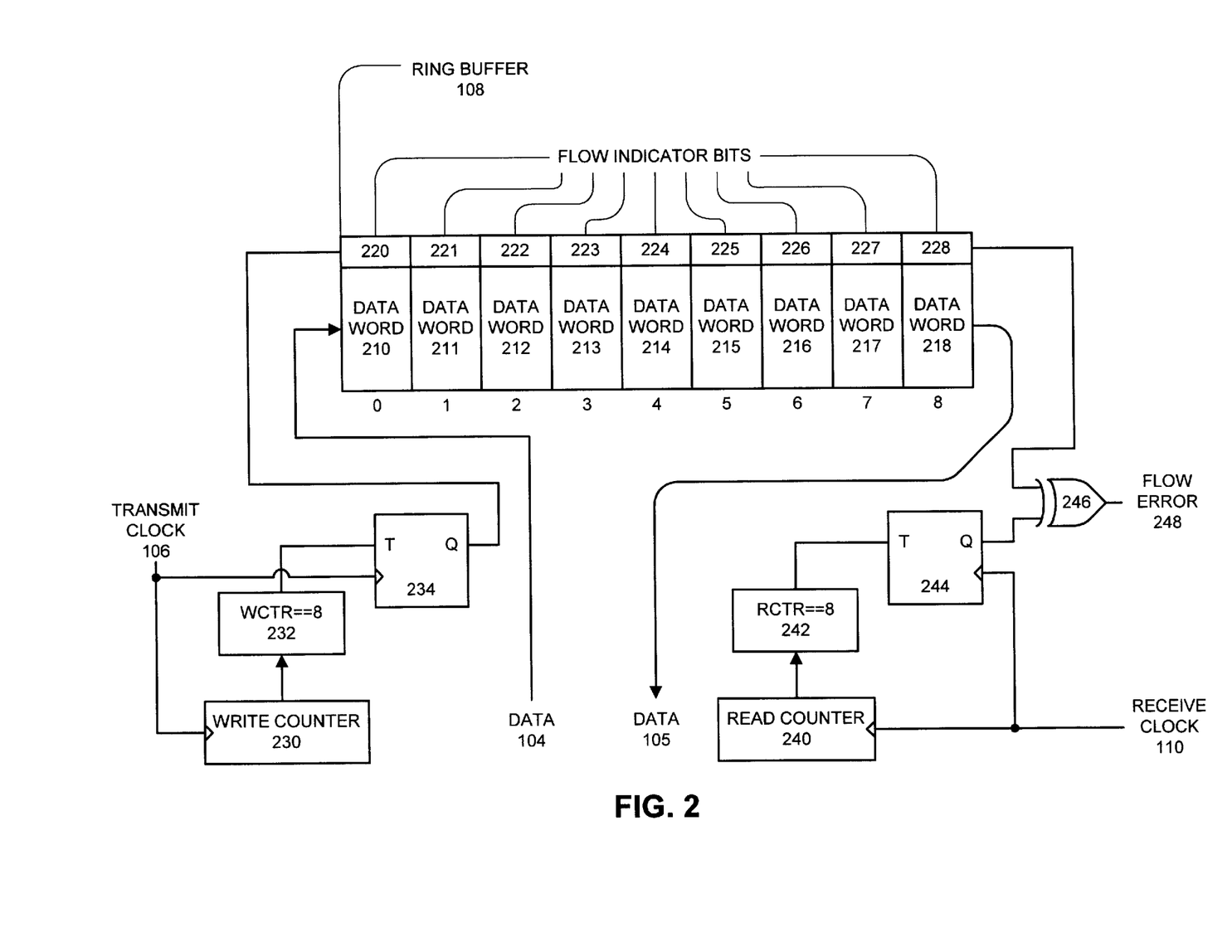
FIG. 2 illustrates circuitry associated with a ring buffer in accordance with a first embodiment of the present invention.

FIG. 2 illustrates circuitry associated with ring buffer 108 in accordance with a first embodiment of the present invention. In this embodiment, ring buffer 108 includes nine entries labeled 0, 1, 2, 3, 4, 5, 6, 7 and 8. Each entry includes a flow indicator bit and a data word. More specifically, entry 0 includes flow indicator bit 220 and data word 210. Entry 1 includes flow indicator bit 221 and data word 211. Entry 2 includes flow indicator bit 222 and data word 212. Entry 3 includes flow indicator bit 223 and data word 213. Entry 4 includes flow indicator bit 224 and data word 214. Entry 5 includes flow indicator bit 225 and data word 215. Entry 6 includes flow indicator bit 226 and data word 216. Entry 7 includes flow indicator bit 227 and data word 217. Entry 8 includes flow indicator bit 228 and data word 218.

Ring buffer 108 is associated with write counter 230 and read counter 240 (These can also be referred to as a read pointer and a write pointer). Write counter 230 contains a value (from zero to eight) which indicates the next item to be written to in ring buffer 108. Read counter 240 contains a similar value (from zero to eight) which indicates the next item to be read from in ring buffer 108.

The contents of write counter 230 feeds through comparison circuit 232, which tests to see if write counter 230 has reached its maximum value of eight. If so, comparison circuit 232 generates a one value that feeds into a toggle input of toggle flip-flop 234. This causes toggle flip-flop 234 to change state. Note that the contents of toggle flip-flop 234 is written into ring buffer 108 along with a corresponding data word during a write operation. Also note that both write counter 230 and toggle flip-flop 234 operate under control of transmit clock signal 106. The circuitry on the left-hand side of ring buffer 108 writes consecutive zeros into flow indicator bits 220–228 and then writes consecutive ones into flow indicator bits 220–228 in an alternating fashion as write pointer 230 cycles through ring buffer 108.

The contents of read counter 240 feeds through comparison circuit 242, which tests to see if read counter 240 has reached its maximum value of eight. If so, comparison circuit 242 generates a one value that feeds into a toggle input of toggle flip-flop 244. This causes toggle flip-flop 244 to change its state. Both read counter 240 and toggle flip-flop 244 operate under control of receive clock 110.

The circuitry on the left-hand side of ring buffer 108 generates consecutive zeros as read counter 240 scans through ring buffer 108, and then generates consecutive ones during the next pass through ring buffer 108.

The contents of toggle flip-flop 244 is compared with a flow indicator bit read from ring buffer 108 using exclusive-OR gate 246 to generate flow error signal 248. Flow error signal 248 assumes a zero value if the flow indicator bit read from ring buffer 108 matches the predicted flow indicator bit stored in toggle flip-flop 244. Otherwise, flow error signal 248 assumes a one value.

If the flow indicator bit read from ring buffer 108 does not match the predicted flow indicator bit stored in toggle flip-flop 244, this indicates that the flow indicator bit read from ring buffer 108 was written in either a preceding or a successive cycle by write counter 230 through ring buffer 108. Hence, an underflow or an overflow has occurred.

Second Embodiment of Ring Buffer

Figure 3:
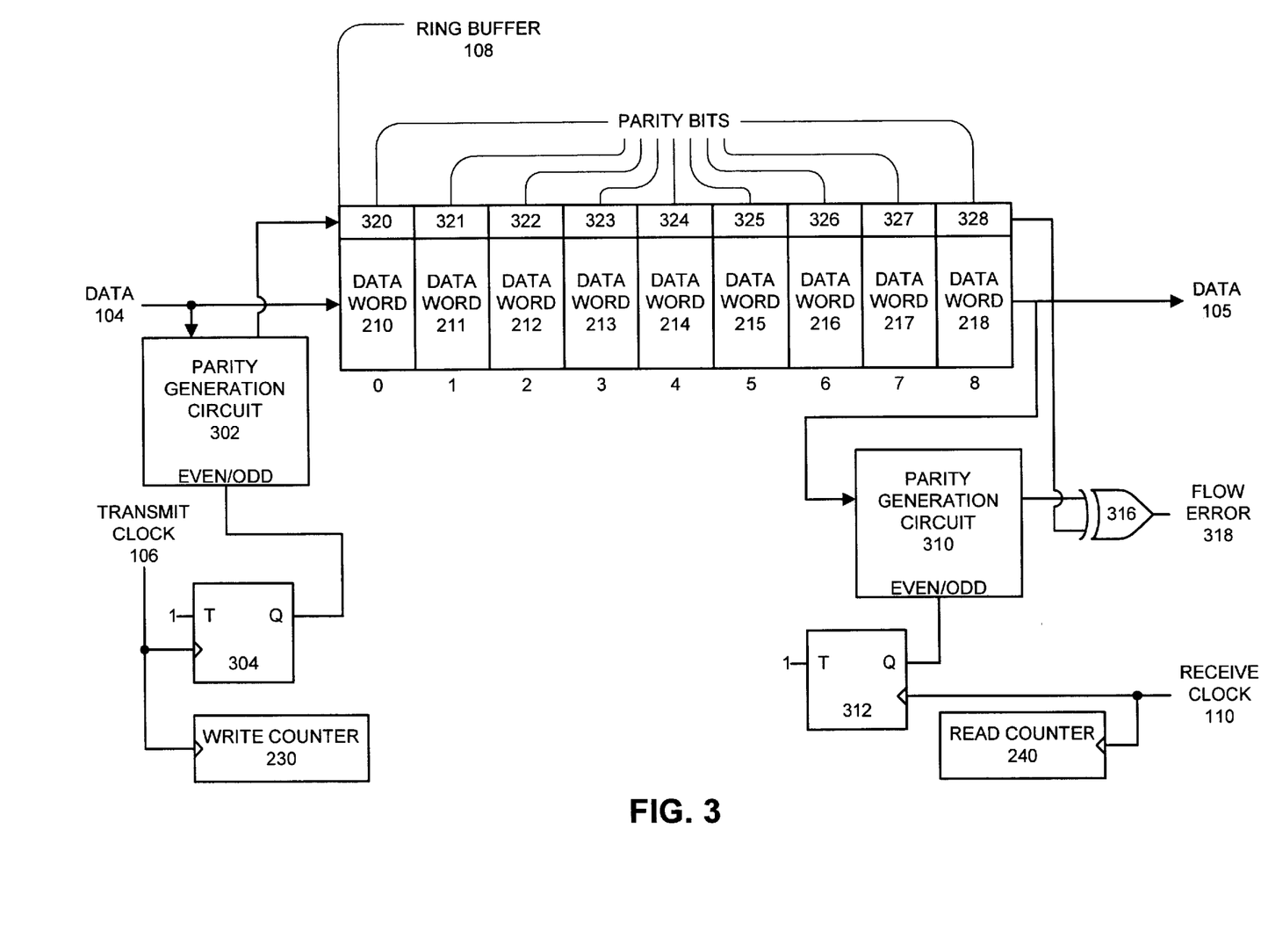
FIG. 3 illustrates circuitry associated with a ring buffer in accordance with a second embodiment of the present invention.

FIG. 3 illustrates circuitry associated with ring buffer 108 in accordance with a second embodiment of the present invention. This second embodiment operates in essentially the same manner as the first embodiment illustrated in FIG. 1. The only difference is that the flow indicator bit is encoded within a parity bit that is associated with each entry in ring buffer 108. Hence, each entry in ring buffer 108 includes a parity bit (with encoded flow information) and a data word. More specifically, entry 0 includes parity bit 320 and data word 210. Entry 1 includes parity bit 321 and data word 211. Entry 2 includes parity bit 322 and data word 212. Entry 3 includes parity bit 323 and data word 213. Entry 4 includes parity bit 324 and data word 214. Entry 5 includes parity bit 325 and data word 215. Entry 6 includes parity bit 326 and data word 216. Entry 7 includes parity bit 327 and data word 217. Entry 8 includes parity bit 328 and data word 218.

As in the first embodiment illustrated in FIG. 2, ring buffer 108 includes a write counter 230 that operates under control of transmit clock signal 106. Transmit clock signal 106 also feeds into the clock input of a toggle flip-flop 304. The toggle input of toggle flip-flop 304 is tied to a one value so that toggle flip-flop 304 changes state every time transmit clock signal 106 advances through a clock cycle. Hence, toggle flip-flop 304 alternately produces zero and one values.

The output of toggle flip-flop 304 passes into an even/odd control input of parity generation circuit 302. Parity generation circuit 302 receives a data word from data 104 and creates a parity bit to accompany the data word. This parity bit can create either an even parity or an odd parity. In the case of even parity, there are an even number of ones in the data word plus the parity bit. In the case of odd parity, there are an odd number of ones in the data word plus the parity bit. This choice of even or odd parity is selected by the even/odd control input in parity generation circuit 302. During a write operation, the parity bit generated by parity generation circuit 302 is recorded along with the associated data word in ring buffer 108.

Note that the polarity of the parity bit generated by parity generation circuit 302 alternates between even and odd parity as the contents of toggle flip-flop 304 alternates between even and odd parity. Hence, alternate parity bits stored in ring buffer 108 will have even parity and odd parity. Since the number of entries in ring buffer 108 is odd, the polarity of an individual parity bit in ring buffer 108 will cycle between even and odd as write counter 230 makes successive passes through ring buffer 108. For example, on a first pass through ring buffer 108, parity bits {320, 321, 322, 323, 324, 325, 326, 327 and 328}, will have the following polarity pattern, {even, odd, even, odd, even, odd, even, odd, even}. On a second pass by write counter 230 through ring buffer 108, the parity bits will have the inverse pattern, {odd, even, odd, even, odd, even, odd, even, odd}. This enables the circuitry illustrated in FIG. 3 to differentiate between a parity bit written in the first pass from a parity bit written to the same location in the second pass; this allows overflow and underflow errors to be detected. For purposes of error detection, any circuitry where parity changes for consecutive stores into every single data word of the buffer is appropriate.

As in FIG. 2, ring buffer 108 also includes read counter 240 that operates under control of receive clock signal 110. Receive clock signal 110 additionally feeds into the clock input of a toggle flip-flop 312. The toggle input of toggle flip-flop 312 is tied to a one value so that toggle flip-flop flop 312 changes state every time receive clock signal 110 advances through a clock cycle. Hence, toggle flip-flop 312 alternately produces zero and one values.

The output of toggle flip-flop 312 passes into an even/odd control input of parity generation circuit 310. Parity generation circuit 310 receives a data word from ring buffer 108 and creates a predicted parity bit. This predicted parity bit is compared against a parity bit read from a corresponding entry in ring buffer 108 using exclusive-OR gate 316 to generate flow error signal 318. Flow error signal 318 assumes a zero value if the parity bit read from ring buffer 108 matches the predicted parity bit generated by parity generation circuit 310. Otherwise, flow error signal 318 assumes a one value.

If the flow indicator bit read from ring buffer 108 does not match the predicted flow indicator bit, this indicates that the flow indicator bit read from ring buffer 108 was written in either a preceding or a successive cycle through ring buffer 108 by write counter 230 or, the parity of the read data is not the same as the parity of the written data. Hence, an underflow, an overflow or a data storage error has occurred. It is very unlikely that more than one of these errors will occur simultaneously.

Note that in one embodiment of the present invention illustrated in FIG. 3, parity generation circuit 302 and toggle flip-flop 304 are integrated with a transmitter, such as remote transmitter 102 in FIG. 1. In this embodiment, the output of parity generation circuit 302 is transferred between the transmitter and the receiver. This enables a single signal to be used to detect both communication errors and flow errors. In another embodiment of the present invention, parity generation circuit 302 and toggle flip-flop 304 are integrated with a receiver. In this case, no parity signal is transmitted between remote transmitter 102 and input port 122.

Third Embodiment of Ring Buffer

Figure 4:
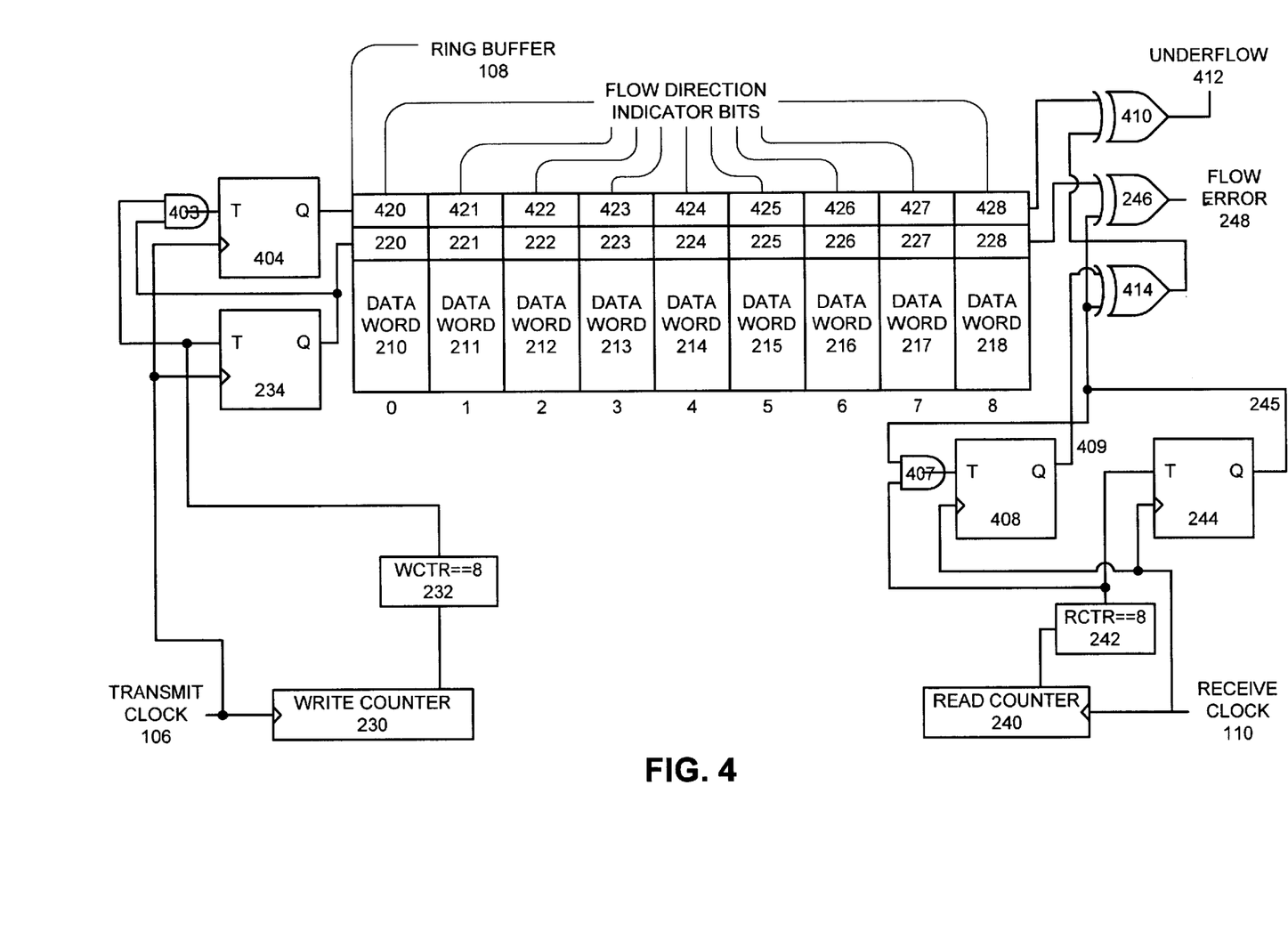
FIG. 4 illustrates circuitry associated with a ring buffer in accordance with a third embodiment of the present invention.

FIG. 4 illustrates circuitry associated with ring buffer 108 in accordance with a third embodiment of the present invention. In this third embodiment, additional circuitry is added to the circuitry illustrated in FIG. 2 to differentiate between an underflow error and an overflow error.

Additional flow direction indicator bits 420–428 have been added to entries in ring buffer 108. More specifically, flow direction indicator bit 420 has been added to entry 0; flow direction indicator bit 421 has been added to entry 1; flow direction indicator bit 422 has been added to entry 2; flow direction indicator bit 423 has been added to entry 3; flow direction indicator bit 424 has been added to entry 4; flow direction indicator bit 425 has been added to entry 5; flow direction indicator bit 426 has been added to entry 6; flow direction indicator bit 427 has been added to entry 7; and flow direction indicator bit 428 has been added to entry 8.

Toggle flip-flop 404 receives an input from the output of AND gate 403. AND gate 403 receives an input from the output of comparison circuit 232 and another input from the output of toggle flip-flop 234. During a write operation, the output of toggle flip-flop 404 is written into an entry of ring buffer 108 along with a corresponding data word and a flow indicator bit.

On the right-hand side of ring buffer 108, toggle flip-flop 408 receives an input from the output of AND gate 407. AND gate 407 receives an input from the output of comparison circuit 242 and another input from the output of toggle flip-flop 244. Predicted flow direction indicator 409, predicted flow indicator 245 and observed flow direction indicator 428 are gated through XOR gates 414 and 410 to produce underflow signal 412.

Figure 7A:
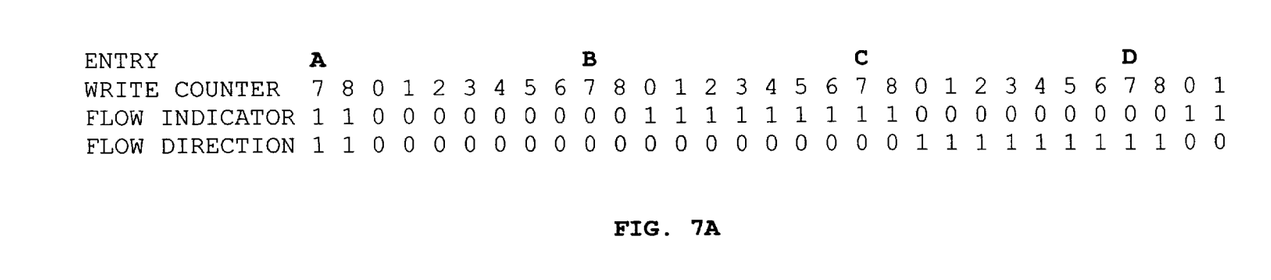
FIG. 7A is a table illustrating the logic behind the operation of the circuitry illustrated in FIG. 4 in accordance with an embodiment of the present invention.

The logic behind the operation of the circuitry illustrated in FIG. 4 can be explained with reference to FIG. 7A and FIG. 7B. In FIG. 7A, note that the flow direction bit changes when the output of comparison circuit 232 is a one and when the output of toggle flip-flop 404 is a one. Hence, the flow direction indicator bit changes every other time that the flow indicator bit changes. This allows exclusive-OR gate 410 to determine if the error is an overflow.

Figure 7B:
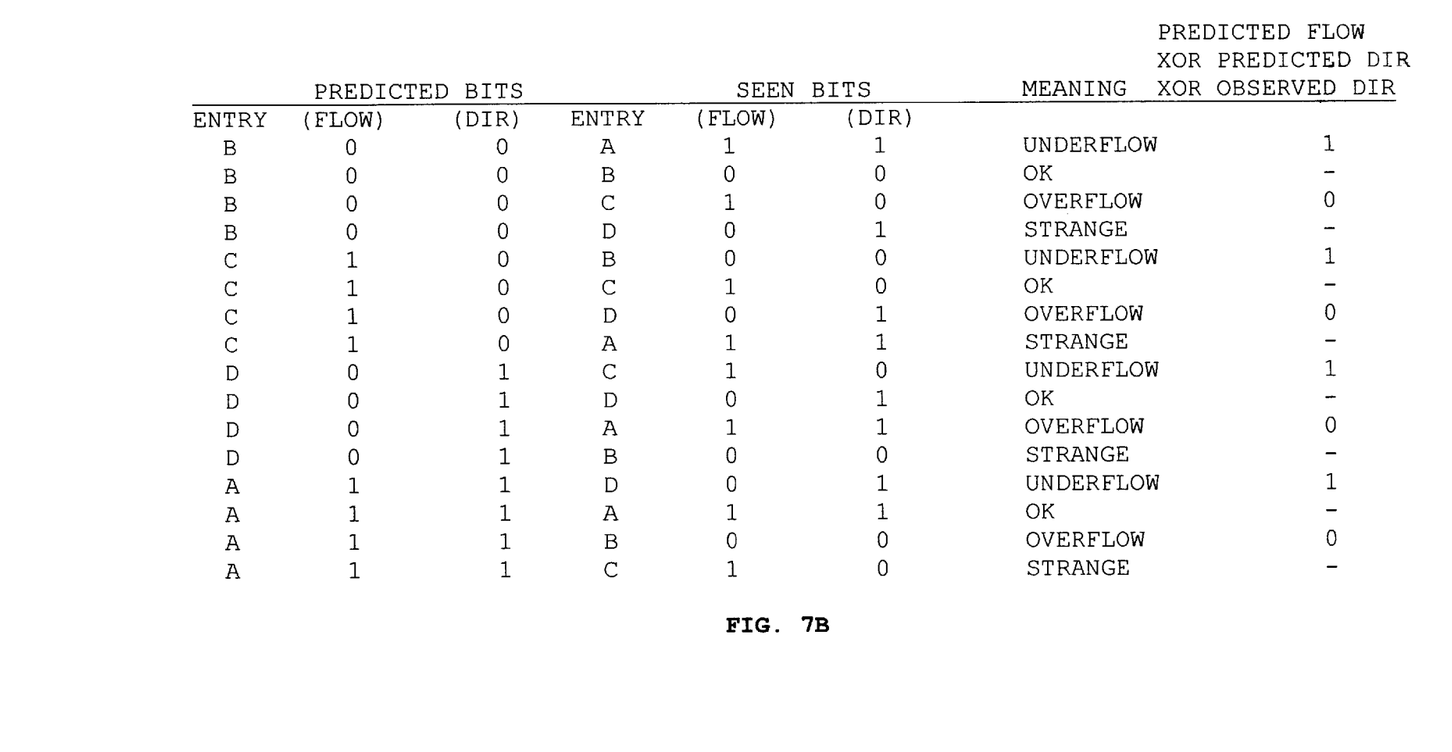
FIG. 7B is another table illustrating the logic behind the operation of the circuitry illustrated in FIG. 4 in accordance with an embodiment of the present invention.

FIG. 7B is extracted from FIG. 7A by inspection. When, in FIG. 7A, entry B is expected at location 7 in ring buffer 108, if entry A is observed, then the expected entry in location 7 has not yet been written. This is the definition of an underflow event. On the other hand, if entry C is observed at location 7 in ring buffer 108, the expected entry has already been overwritten by a new entry. This is the definition of an overflow event. Each line in FIG. 7B is extracted by this inspection process from FIG. 7A.

Referring to FIG. 7B, If the predicted flow indicator and flow direction indicator bits are the same as the bits that are actually seen, the system is functioning without error, which means the system is "OK." FIG. 7B includes a column for the value of the computation "(predicted flow indicator) XOR (predicted flow direction indicator) XOR (observed flow direction indicator)" It can be seen from FIG. 7B that this represents the underflow condition for the cases where the predicted flow indicator differs from the observed flow indicator. Where the predicted and observed flow indicators differ, and this computation produces the value zero, the error is an overflow. Note that a number of combinations are marked as having a "STRANGE" meaning. This indicates that these types of errors should not occur during system operation, and if they do it is not clear whether the error involves an overflow, an underflow or some other type of error.

Operation of Writing Mechanism

Figure 5A:
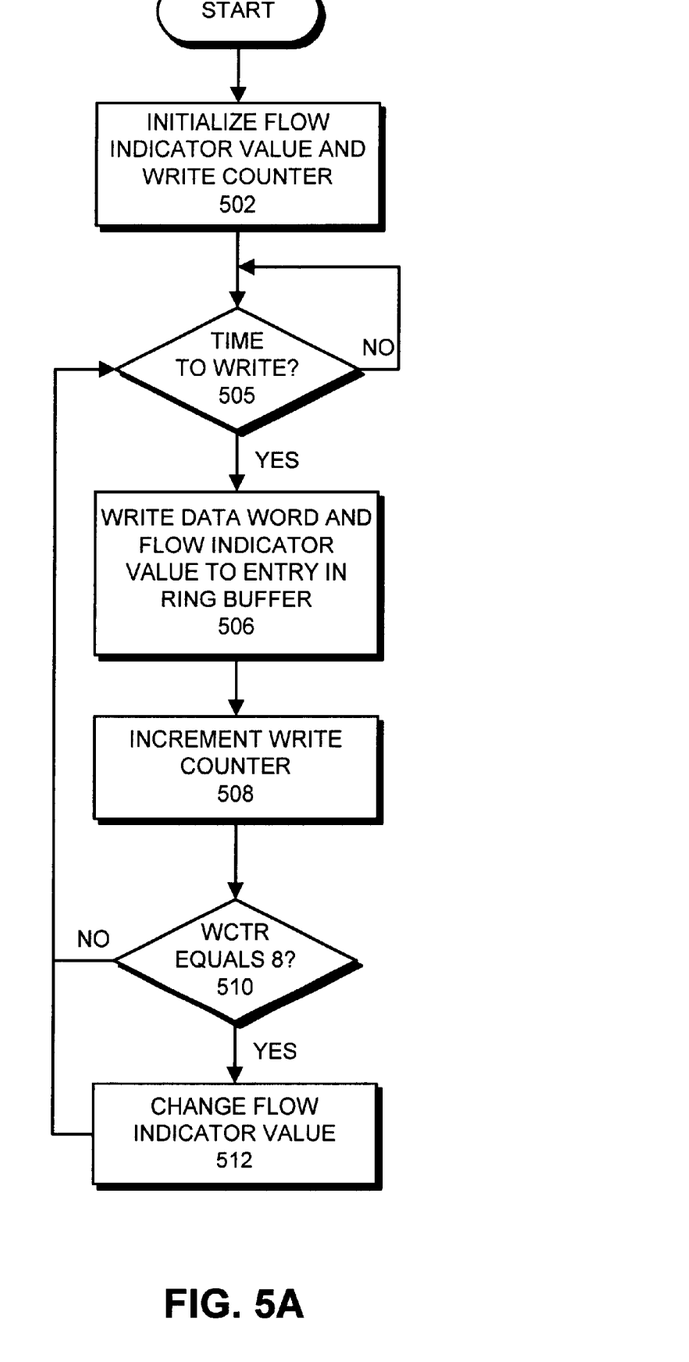
FIG. 5A is a flow chart illustrating the operation of a mechanism that writes into the ring buffer in accordance with an embodiment of the present invention.

FIG. 5A is a flow chart illustrating the operation of a mechanism that writes into ring buffer 108 in accordance with the first embodiment of the present invention. The system first initializes a flow indicator value and write counter 230 (step 502). After these values are initialized, the system enters a loop where the system waits until it is time to write into ring buffer 108 (step 505). When it is time to write into ring buffer 108, the system writes the data word and the flow indicator value into the entry within ring buffer 108 that is pointed to by write counter 230 (step 506). Next, the system increments write counter 230 (step 508) and tests the write counter 230 to see if it equals the maximum value of eight (step 510). If so, the system changes the flow indicator value (step 512) and returns to step 505 to repeat the process for the next data word. Otherwise, the system returns directly to step 505.

Operation of Reading Mechanism

Figure 5B:
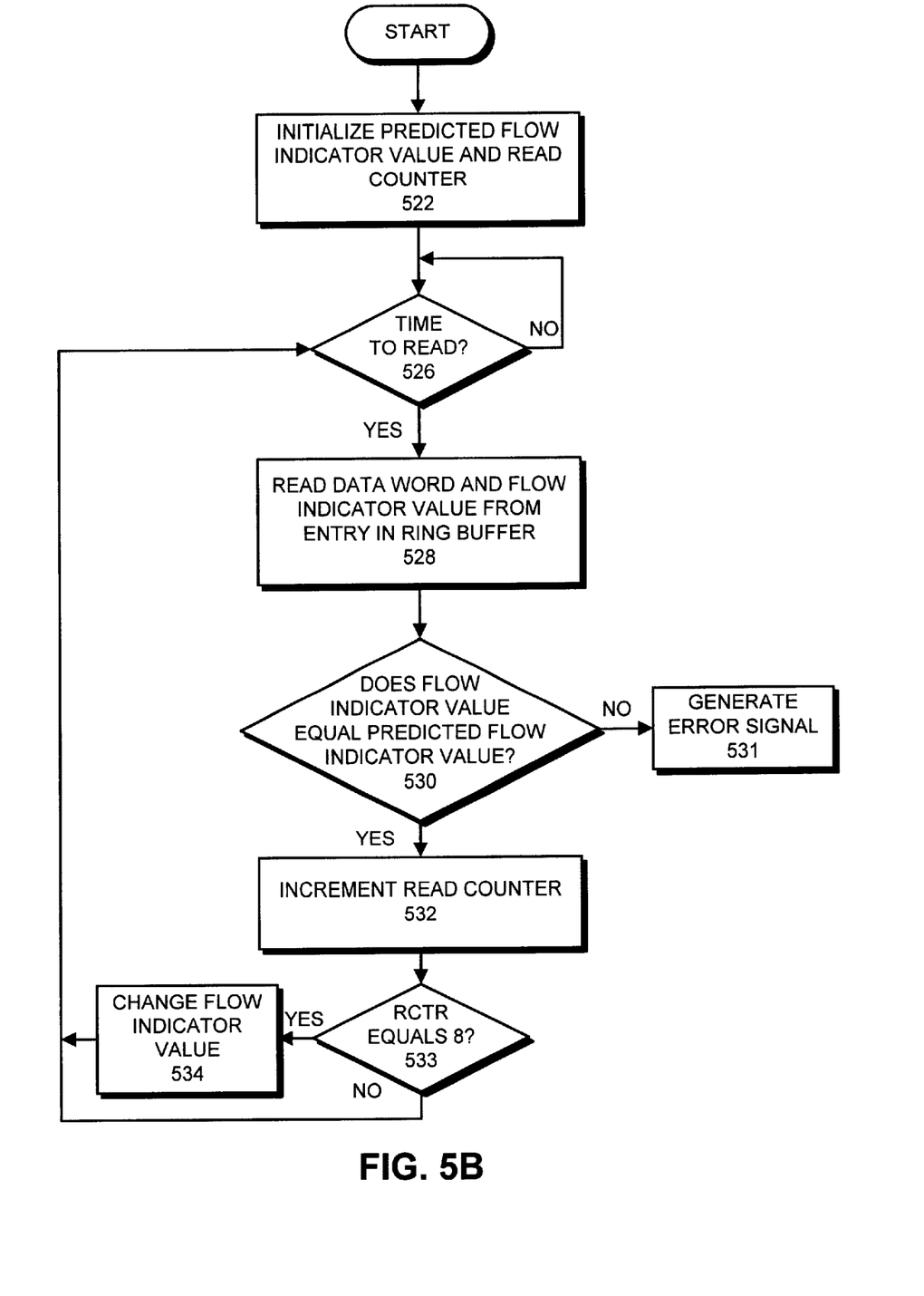
FIG. 5B is a flow chart illustrating the operation of a mechanism that reads from the ring buffer in accordance with an embodiment of the present invention.

FIG. 5B is a flow chart illustrating the operation of a mechanism that reads from ring buffer 108 in accordance with the first embodiment of the present invention. The system first initializes a predicted flow indicator value and read counter 240 (step 522). After these values are initialized, the system enters a loop where the system waits until it is time to read from ring buffer 108 (step 526). When it is time to read from ring buffer 108, the system reads a data word and a corresponding flow indicator value from the entry within ring buffer 108 that is pointed to by read counter 240 (step 528). Next, the system determines if the flow indicator value read from ring buffer 108 matches the predicted flow indicator value (step 530). If not, the system generates an error signal (step 531).

If so, the system increments read counter 240 (step 532) and tests the read counter 240 to see if it equals the maximum value of eight (step 533). If so, the system changes the flow indicator value (step 534) and returns to step 526 to repeat the process for the next data word. Otherwise, the system returns directly to step 526.

Example of Error Free Operation

Figure 6A:
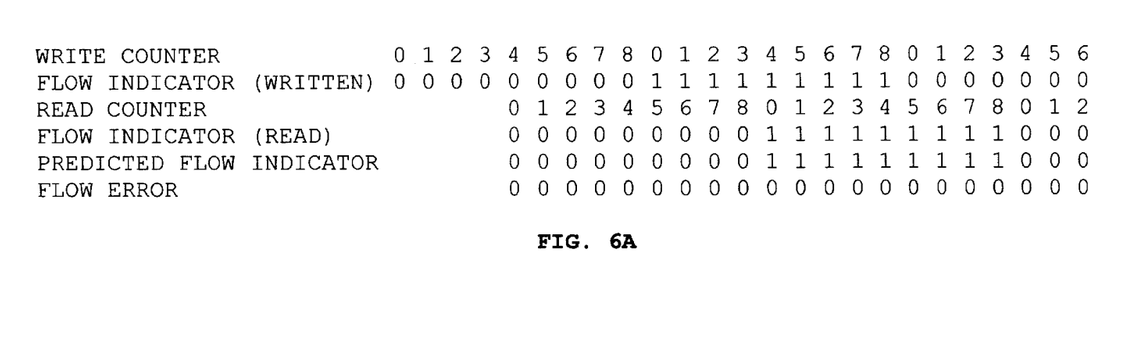
FIG. 6A illustrates error-free operation of a ring buffer in accordance with an embodiment of the present invention.

FIG. 6A illustrates error-free operation of ring buffer 108 in accordance with the first embodiment of the present invention. In FIG. 6A, time advances from left to right and the rows indicate the state of various quantities at different points in time.

As can be seen from FIG. 6A, the flow indicator value written into ring buffer 108 alternates between zero and one as write counter 230 completes cycles through ring buffer 108. As read counter 240 cycles through the same entries in ring buffer 108, the predicted flow indicator has the same value as the flow indicator value read from ring buffer 108. Hence, flow error signal 248 is never asserted.

Example of Overflow

Figure 6B:
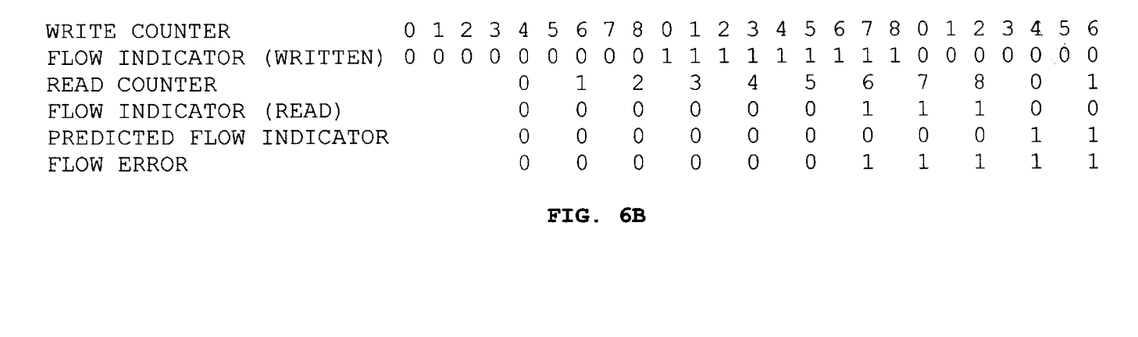
FIG. 6B illustrates detection of an overflow condition in the ring buffer in accordance with an embodiment of the present invention.

FIG. 6B illustrates detection of an overflow condition in ring buffer 108 in accordance with the first embodiment of the present invention. In this example, the reading process proceeds at half the rate of the writing process. Note that when read counter 240 first encounters entry 6, write counter has cycled around ring buffer 108 twice to write a flow indicator value of one in entry 6. This causes the flow indicator value read from ring buffer 108 not to match the predicted flow indicator value. Hence, a flow error signal is generated.

Example of Underflow

Figure 6C:
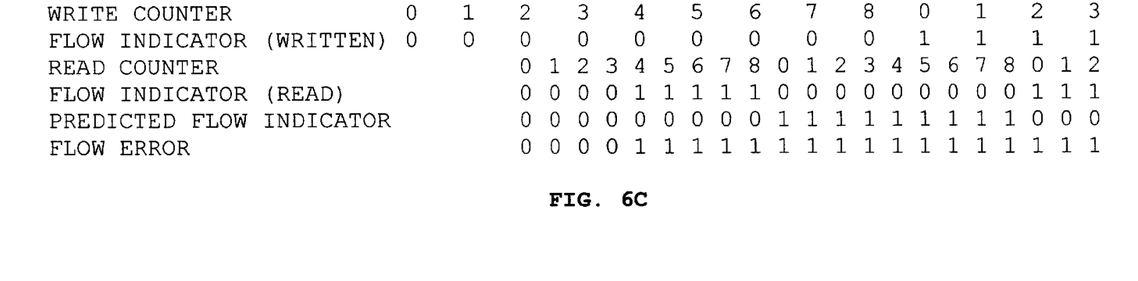
FIG. 6C illustrates detection of an underflow condition in the ring buffer in accordance with an embodiment of the present invention.

FIG. 6C illustrates detection of an underflow condition in the ring buffer in accordance with the first embodiment of the present invention. In this example, the writing process proceeds at half the rate of the reading process. Consequently, when the reading process gets to entry 4, it reads a flow indicator value of one that was left over from the previous cycle by the writing process. This causes the flow indicator value read from ring buffer 108 not to match the predicted flow indicator value. Hence, a flow error signal is generated. This flow error signal is latched by the system, and thereafter persists until it is reset.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for detecting underflow and overflow errors within a ring buffer, the ring buffer being written to by a writing mechanism that operates in a first clock domain, and being read from by a reading mechanism that operates in a second clock domain, the method comprising:

receiving a data word to be transferred through the ring buffer;

generating a flow indicator value to be stored with the data word in the ring buffer, the flow indicator value containing information that facilitates determining if an underflow has occurred while reading from the ring buffer, or an overflow has occurred while writing to the ring buffer, wherein the flow indicator value periodically changes, so that a predictably different flow indicator value is written to each entry in the ring buffer upon successive write operations to each entry;

storing the data word along with the flow indicator value in an entry in the ring buffer;

reading the entry from the ring buffer using the reading mechanism;

generating a predicted flow indicator value within the reading mechanism, the predictably different flow indicator value allowing an underflow condition or an overflow condition to be detected as a difference between the flow indicator value and the predicted flow indicator value;

comparing a flow indicator value from the entry read from the ring buffer with the predicted flow indicator value, wherein the flow indicator value is encoded as changes between even and odd parity in a parity bit in the data word; and generating a flow error signal if the flow indicator value differs from the predicted flow indicator value, wherein the flow error signal indicates one of the underflow and the overflow.

2. The method of claim 1, further comprising generating a flow direction indicator value to be stored with the data word in the ring buffer, the flow direction indicator value containing information that facilitates determining whether a flow error is an overflow or and underflow;

storing the flow direction indicator value along with the data word in the entry in the ring buffer; and using the predicted values of the flow direction indicator and the flow indicator as well as the observed value of the flow direction indicator to compute whether an observed flow error is an underflow or an overflow.

3. The method of claim 1, wherein the flow indicator value includes a single bit that changes every time a write pointer for the ring buffer reaches a maximum value, the write pointer pointing to an entry to be written to in the ring buffer.

4. The method of claim 1, wherein the ring buffer is of odd size and the flow indicator value is a single bit that alternates between zero and one on successive write operations.

5. The method of claim 1, wherein the flow indicator value is encoded as changes between even and odd parity in a parity bit in the data word, and wherein ring buffer is of odd size and the parity bit alternates between even and odd parity on successive write operations.

6. The method of claim 1, wherein the flow indicator value and the data word are stored into the ring buffer using a single atomic write operation.

7. The method of claim 1, wherein the flow indicator value further includes a flow direction indicator that allows an underflow error to be differentiated from an overflow error.

8. The method of claim 1, wherein the step of generating the flow indicator value to be stored with the data word takes place at a remote transmitter that is separate from a chip containing the ring buffer.

9. The method of claim 1, wherein the step of generating the flow indicator value to be stored with the data word takes place locally within a chip containing the ring buffer.

10. An apparatus that detects underflow and overflow errors within a ring buffer, comprising:

the ring buffer;

a flow indicator generator that generates a flow indicator value to be stored along with a data word in the ring buffer, the flow indicator value containing information that facilitates determining if an underflow has occurred while reading from the ring buffer, or if an overflow has occurred while writing to the ring buffer;

wherein the flow indicator generator is configured to periodically change the flow indicator value, so that a predictably different flow indicator value is written to each entry in the ring buffer upon successive write operations to the entry, the predictably different flow indicator value allowing an underflow condition or an overflow condition to be detected as a difference between the flow indicator value and the predicted flow indicator value;

a writing mechanism that operates in a first clock domain and is configured to store the data word along with the flow indicator value in an entry in the ring buffer;

a reading mechanism that operates in a second clock domain and is configured to read the entry from the ring buffer;

a predicted flow indicator generator, within the reading mechanism, that is configured to generate a predicted flow indicator value;

a comparison mechanism that is configured to compare a flow indicator value from the entry read from the ring buffer with the predicted flow indicator value, wherein the flow indicator value is encoded as changes between even and odd parity in a parity bit in the data word; and an error generator that is configured to generate a flow error signal if the flow indicator value differs from the predicted flow indicator value, wherein the flow error signal indicates one of the underflow and the overflow.

11. The apparatus of claim 10, wherein the flow indicator generator is configured to generate a flow direction indicator value to be stored with the data word in the ring buffer, the flow direction indicator value containing information that facilitates determining whether a flow error is an overflow or and underflow; and wherein the comparison mechanism is configured to compare a flow direction indicator value from the entry read from the ring buffer with the predicted flow indicator value to determine whether a flow error is an overflow or and underflow.

12. The apparatus of claim 10, wherein the flow indicator value includes a single bit, and wherein the flow indicator generator is configured to change the single bit every time a write pointer for the ring buffer reaches a maximum value, the write pointer pointing to an entry to be written to in the ring buffer.

13. The apparatus of claim 10, wherein the ring buffer is of odd size and the flow indicator value is a single bit that alternates between zero and one on successive write operations.

14. The apparatus of claim 10, wherein the flow indicator generator is configured to encode the flow indicator value in changes between even and odd parity in a parity bit in the data word; and wherein ring buffer is of odd size and the parity bit alternates between even and odd parity on successive write operations.

15. The apparatus of claim 10, wherein the writing mechanism is configured to store the flow indicator value and the data word into the ring buffer using a single atomic write operation.

16. The apparatus of claim 10, wherein the flow indicator value further includes a flow direction indicator, and wherein the flow indicator generator is configured to change the flow direction indicator so as to allow an underflow error to be differentiated from an overflow error.

17. The apparatus of claim 10, wherein the flow indicator generator is located at a remote transmitter that is separate from a chip containing the ring buffer.

18. The apparatus of claim 10, wherein the flow indicator generator is located within a chip containing the ring buffer.

19. A computer system including an apparatus that detects underflow and overflow errors within a ring buffer, comprising:

a processor;

a memory;

the ring buffer;

a flow indicator generator that generates a flow indicator value to be stored along with a data word in the ring buffer, the flow indicator value containing information that facilitates determining if an underflow has occurred while reading from the ring buffer, wherein the flow indicator value periodically changes, so that a predictably different flow indicator value is written to each entry in the ring buffer upon successive write operations to each entry or if an overflow has occurred while writing to the ring buffer;

a writing mechanism that operates in a first clock domain and is configured to store the data word along with the flow indicator value in an entry in the ring buffer;

a reading mechanism that operates in a second clock domain and is configured to read the entry from the ring buffer;

a predicted flow indicator generator, within the reading mechanism, that is configured to generate a predicted flow indicator value;

a comparison mechanism that is configured to compare a flow indicator value from the entry read from the ring buffer with the predicted flow indicator value, wherein the flow indicator value is encoded as changes between even and odd parity in a parity bit in the data word; and an error generator that is configured to generate a flow error signal if the flow indicator value differs from the predicted flow indicator value, wherein the flow error signal indicates one of the underflow and the overflow.

* * * * *